(12) United States Patent
Vernon et al.

(10) Patent No.: US 12,703,233 B2
(45) Date of Patent: Aug. 11, 2026

(54) DUAL ELECTRIC MOTOR ASSEMBLY SYSTEMS AND METHODS

(71) Applicant: TOYOTA MOTOR ENGINEERING & MANUFACTURING NORTH AMERICA, INC., Plano, TX (US)

(72) Inventors: Nicholas S. Vernon, Brighton, MI (US); Luke E. Trapani, Ypsilanti, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 520 days.

(21) Appl. No.: 18/295,487

(22) Filed: Apr. 4, 2023

(65) Prior Publication Data

US 2024/0336121 A1 Oct. 10, 2024

(51) Int. Cl.
*B60K 1/02* (2006.01)

(52) U.S. Cl.
CPC .................................... *B60K 1/02* (2013.01)

(58) Field of Classification Search
CPC . B60K 1/02; B60K 1/00; B60K 17/00; B60K 17/043; B60K 17/24; B60K 17/04; B60K 7/0007; B60K 7/00; B60K 2007/0046; B60K 2007/0061
See application file for complete search history.

(56) References Cited

U.S. PATENT DOCUMENTS

| | | | | |
|---|---|---|---|---|
| 5,419,406 A * | 5/1995 | Kawamoto | B60K 1/02 | 475/5 |
| 5,558,589 A * | 9/1996 | Schmidt | B60K 6/48 | 903/910 |
| 5,660,077 A | 8/1997 | Nekola | | |
| 5,751,081 A * | 5/1998 | Morikawa | B60K 17/16 | 475/284 |
| 6,321,865 B1 * | 11/2001 | Kuribayashi | B60K 6/365 | 903/910 |
| 6,615,946 B2 * | 9/2003 | Pasquini | B60L 50/52 | 180/65.6 |
| 7,326,141 B2 * | 2/2008 | Lyons | B62D 11/16 | 180/6.7 |
| 7,508,100 B2 | 3/2009 | Foster | | |
| 8,155,834 B2 * | 4/2012 | Murahashi | B60W 10/30 | 184/26 |
| 8,336,655 B2 * | 12/2012 | Knoblauch | B60K 7/0007 | 477/3 |

(Continued)

*Primary Examiner* — James M Dolak
(74) *Attorney, Agent, or Firm* — HAYNES AND BOONE, LLP

(57) ABSTRACT

Systems and methods directed to a dual electric motor assembly are provided. A drive system includes a two-piece casing and a first drive assembly, a second drive assembly, and a center support housed within the two-piece casing. The first drive assembly may include a first motor paired to a first transmission. The second drive assembly may include a second motor paired to a second transmission. The center support may be arranged between the first drive assembly and the second drive assembly to support the first transmission and the second transmission. Additional systems and associated methods are also provided.

20 Claims, 5 Drawing Sheets

(56) References Cited

U.S. PATENT DOCUMENTS 8,622,861 B2 * 1/2014 Nett ...................... B60W 20/00
475/5
8,632,434 B2 * 1/2014 Kira ...................... B60W 10/18
475/249
8,641,568 B2 * 2/2014 Knoblauch .......... B60K 7/0007
310/90
8,678,118 B2 * 3/2014 Takenaka ................. B60K 6/52
180/65.6
8,960,341 B2 * 2/2015 Weber ................. B60L 15/2054
180/65.6
9,140,335 B2 * 9/2015 Knoblauch .......... B60K 17/046
9,150,090 B2 * 10/2015 Hiyoshi ................... B60K 1/02
9,221,334 B2 * 12/2015 Knoblauch .............. B60K 1/02
9,592,732 B2 * 3/2017 Frohnmayer .......... B60K 17/08
9,951,850 B2 * 4/2018 Kramer ............... F16H 57/0494
10,207,572 B2 * 2/2019 Makino ................ B60K 7/0007
10,259,318 B2 * 4/2019 Frohnmayer ........ B60K 7/0007
10,384,535 B2 * 8/2019 Isono ................... B60K 17/046
10,442,291 B2 * 10/2019 Isono ..................... B60K 23/04
10,493,978 B2 * 12/2019 Haupt ................... B60W 10/10
10,556,617 B2 * 2/2020 Wang ................... B62D 5/0424
10,703,201 B2 * 7/2020 Bassis .................. B60K 7/0007
10,710,462 B2 * 7/2020 Yamaguchi ......... B60L 15/2036
10,895,320 B2 * 1/2021 Suyama .................. F16H 48/10
10,938,273 B2 3/2021 Verbridge
11,021,055 B2 * 6/2021 Crotti ....................... B60K 1/04
11,110,805 B2 * 9/2021 Hirata ...................... B60K 1/02
11,155,161 B2 * 10/2021 Makino ................ B60K 17/145
11,173,781 B2 * 11/2021 Mock ................... B60K 17/046
11,198,359 B2 * 12/2021 Payne .................... B60K 17/02
11,628,713 B2 * 4/2023 Williams ............... B60K 17/24
180/54.1
11,635,130 B2 * 4/2023 Williams .............. F16H 57/043
74/650
11,701,957 B1 * 7/2023 Janson .................. F16H 37/041
475/149
12,007,008 B2 * 6/2024 Chiba ..................... F16H 48/36
12,240,305 B2 * 3/2025 Takahashi ................ B60K 1/02
12,403,761 B2 * 9/2025 Terao ................... B60K 7/0007
12,420,621 B2 * 9/2025 Ren ........................ H02K 17/32
12,473,970 B2 * 11/2025 Gassmann .......... F16H 57/0435
12,489,336 B2 * 12/2025 Ito ......................... H02M 7/003
12,502,953 B2 * 12/2025 Chen ...................... B60K 17/04
12,508,898 B2 * 12/2025 Yanagihara ............ B60K 17/12
12,510,136 B1 * 12/2025 Kaltenbach ............. F16H 3/728
12,539,755 B2 * 2/2026 Rossia ..................... B60K 1/02
12,539,769 B2 * 2/2026 Devaraj ................. B60K 17/02
12,540,660 B2 * 2/2026 Ishihara ................... B60K 1/00
2009/0014223 A1 * 1/2009 Jones ..................... B60K 17/16
903/903
2019/0264790 A1 * 8/2019 Suzuki .................... F16H 57/04
2020/0164736 A1 5/2020 Verbridge
2021/0379977 A1 12/2021 Williams

* cited by examiner

DUAL ELECTRIC MOTOR ASSEMBLY SYSTEMS AND METHODS

TECHNICAL FIELD

The present disclosure relates generally to electric vehicles, and, more particularly, to a drive system having a dual electric motor configuration.

BACKGROUND

Some dual motor assembly configurations utilize independent motors at or near the wheel hubs of a vehicle, where the vehicle's suspension is used to support the additional weight of the motors. Additionally, or alternatively, some dual motor assembly configurations include multiple components and mating surface seams that provide multiple points of potential failure. Therefore, a need exists for more reliable motor assembly configurations.

BRIEF SUMMARY

Various embodiments of the present disclosure include a drive system. The drive system includes a two-piece casing and a first drive assembly, a second drive assembly, and a center support housed within the two-piece casing. The first drive assembly may include a first motor paired to a first transmission. The second drive assembly may include a second motor paired to a second transmission. The center support may be arranged between the first drive assembly and the second drive assembly to support the first transmission and the second transmission.

Various embodiments of the present disclosure include a drive system. The drive system includes a two-piece casing comprising a first housing secured to a second housing. The drive system further includes a first drive assembly and a second drive assembly positioned within the two-piece casing. The drive system further includes a center support internally fastened within the two-piece casing to one or the first housing or the second housing. The center support may be positioned to support at least portions of the first drive assembly and the second drive assembly.

Various embodiments of the present disclosure include a drive system. The drive system includes a first drive unit, a second drive unit secured to the first drive unit, and a center support arranged between the first drive unit and the second drive unit. The first drive unit may include a first housing, a first motor positioned within the first housing, and a first transmission paired to the first motor and positioned within the first housing. The second drive unit may include a second housing, a second motor positioned within the second housing, and a second transmission paired to the second motor and positioned within the second housing. The center support may be configured to support the first transmission and the second transmission. The center support may be secured internally to one of the first housing or the second housing.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1A:
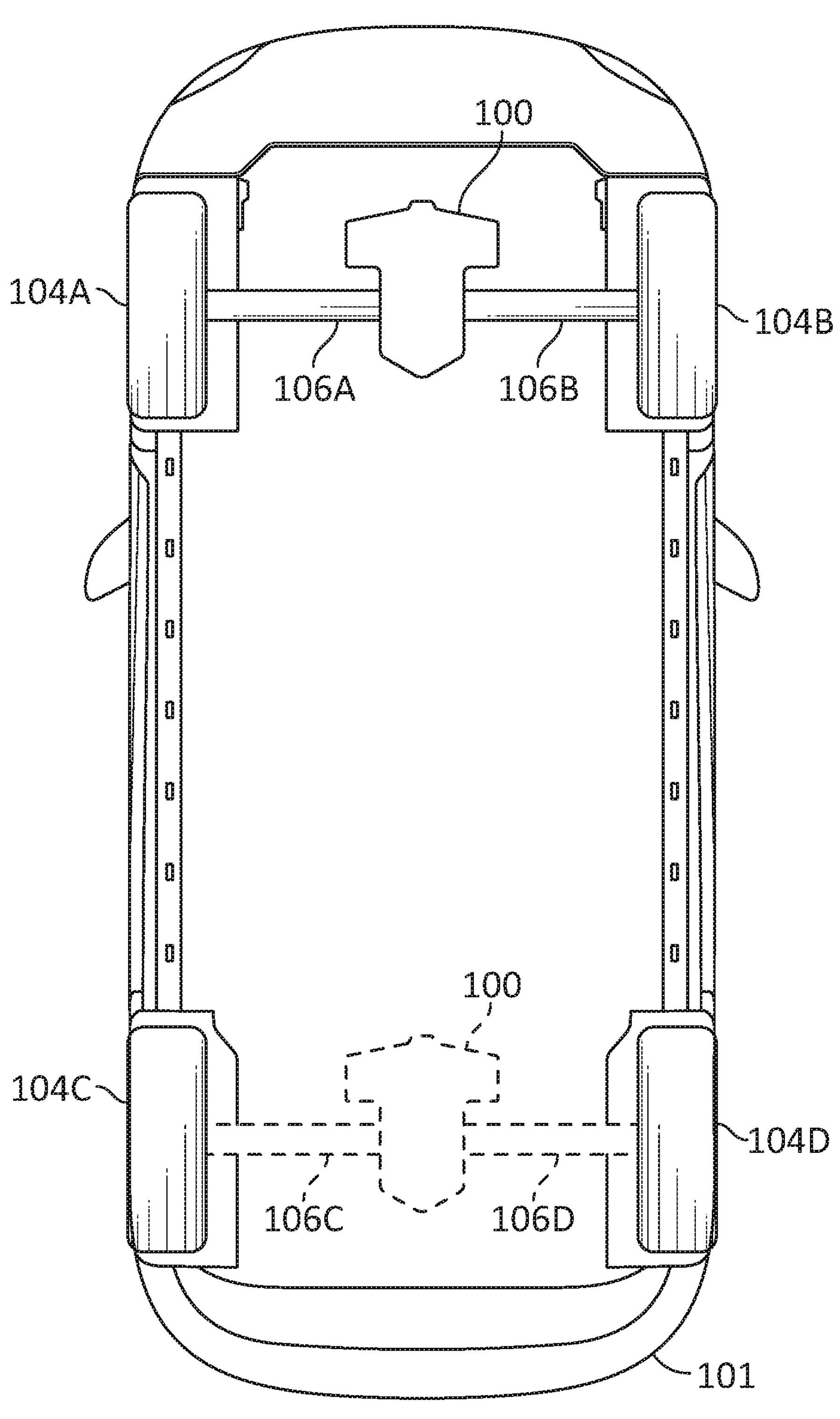
FIG. 1A is a diagram illustrating a schematic view of a drive system for a vehicle, according to one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to dual motor assembly systems and methods. For example, embodiments are directed to a two-piece enclosure for a dual motor and transmission assembly. Compared to some conventional designs, embodiments of the present disclosure have less components and mating surface seams to reduce potential failure points. For example, a dual electric motor assembly or drive system is provided to provide independent power to separate wheels (e.g., a left and right wheel of the same axle). Each motor assembly includes an electric motor and a transmission (e.g., a gearbox having multiple gears) enclosed within a two-piece enclosure. The two motor assemblies (e.g., first/left and second/right motor/transmission pairings) are housed in a two-piece outer casing with a center support between the motor assemblies, as more fully detailed below. The two-piece outer casing has less seams compared to conventional configurations (e.g., 4-piece housing configurations), which makes embodiments of the present disclosure less prone to leaks and provides a more robust configuration using less parts and a more durable housing. For example, the present disclosure may provide a single seam, two-piece casing having one or more supports/divider walls all internal to the outer casing, as detailed herein.

FIG. 1A is a diagram illustrating a schematic view of a vehicle drive system, according to one or more embodiments of the disclosure. Referring to FIG. 1A, a vehicle 101 may include a drive system 100 operable to provide a motive force. For example, vehicle 101 may be a hybrid or fully electric vehicle, with drive system 100 operable to convert direct current (DC) or alternating current (AC) electrical energy into mechanical energy, such as via various electric motors and transmissions, as detailed below. Vehicle 101 may be a truck, a van, a bus, a sedan, a utility vehicle (e.g., a SUV, a CUV, etc.), or any other type of vehicle. In embodiments, vehicle 100 is not limited to automobiles, and may include recreational vehicles (RVs), an off-highway vehicle (OHV), a side-by-side vehicle, or a golf cart, among other vehicles.

As shown, vehicle 101 may include multiple wheels 104, such as a first wheel 104A, a second wheel 104B, a third wheel 104C, and a fourth wheel 104D, although other configurations are contemplated. In embodiments, first and second wheels 104A, 104B may form a first axle of vehicle 101, such as a front axle, and third and fourth wheels 104C, 104D may form a second axle of vehicle 101, such as a rear axle, although other configurations are contemplated. Depending on the application, drive system 100 may be mounted or integrated into the front axle and/or the rear axle of vehicle 101. For example, a first drive system 100 may be mounted or integrated into the front axle, and a second drive system 100 may be mounted or integrated into the rear axle, although other configurations are contemplated. When mounted or integrated into the front axle of vehicle 101, drive system 100 may be coupled to first wheel 104A and second wheel 104B via a first axle 106A and a second axle 106B, respectively. When mounted or integrated into the rear axle of vehicle 101, drive system 100 may be coupled to third wheel 104C and fourth wheel 104D via a third axle 106C and a fourth axle 106D, respectively. Each of first axle 106A, second axle 106B, third axle 106C, and fourth axle 106D may be a CV axle with one or more constant velocity (CV) joints, although other configurations are contemplated.

Vehicle 101 may include various components to facilitate operation of drive system 100 and/or vehicle 101 itself. For instance, vehicle 101 may include one or more batteries (e.g., battery packs), an onboard charger system, a converter/transformer (e.g., a DC/DC converter, etc.), a power control unit, or any combination thereof to facilitate the conversion of electrical energy into kinetic forces that drive vehicle 101 forward or in reverse. In embodiments, vehicle 101 may include other systems, including a thermal system, a steering system, a braking system, and one or more safety systems, among other vehicle systems.

Figure 1B:
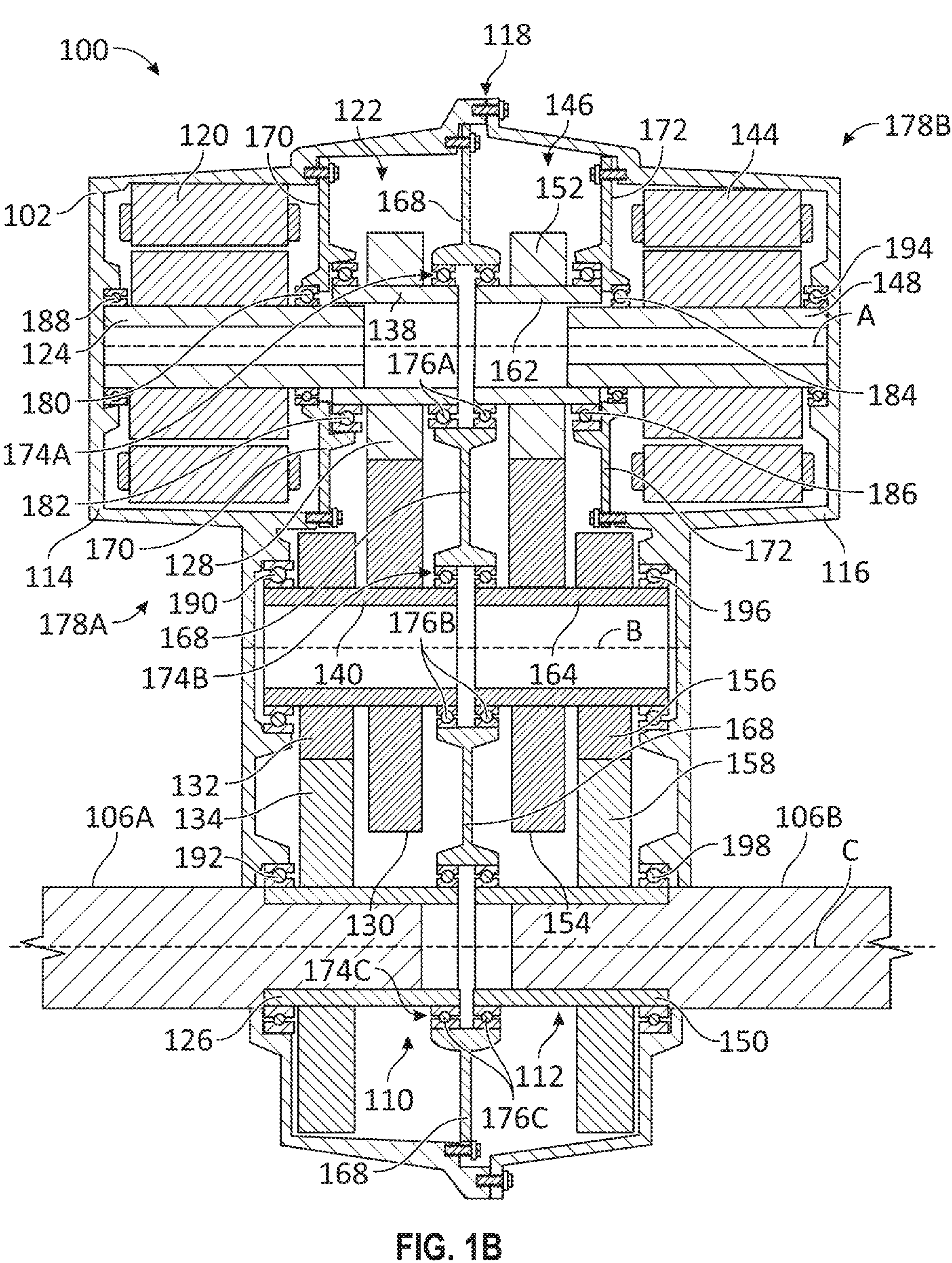
FIG. 1B is a diagram illustrating a cross-sectional view of the drive system of FIG. 1A, according to one or more embodiments of the disclosure.

FIG. 1B is a diagram illustrating a cross-sectional view of drive system 100, with the cross-section looking down or up into drive system 100, according to one or more embodiments of the disclosure. Referring to FIG. 1B, drive system 100 includes a two-piece casing 102 enclosing multiple drive systems (e.g., motor and transmission assemblies) therein. For example, drive system 100 may include a first drive assembly 110 and a second drive assembly 112 each positioned or housed within two-piece casing 102. The drive assemblies may be used to provide power to one or more wheels of vehicle 101. For example, first drive assembly 110 may provide power to a first wheel (e.g., first wheel 104A), and second drive assembly 112 may provide power to a second wheel (e.g., second wheel 104B), of a front or rear axle of vehicle 101. In such embodiments, drive system 100 may be mounted or integrated into the front or rear axle of vehicle 101 to provide separate power for the first and second wheels.

With continued reference to FIG. 1B, two-piece casing 102 includes a first housing 114 secured to a second housing 116, such as at a seam 118. Each of first housing 114 and second housing 116 may be a cast or machined component with sufficient strength and/or other characteristic for the application. For example, first housing 114 and second housing 116 may be formed of a material (e.g., an aluminum alloy) to reduce relative weight and/or provide corrosion resistance. First housing 114 and second housing 116 may be complementary, such that connection of first housing 114 to second housing 116 defines an outer casing and/or an internal cavity having desired space characteristics (e.g., internal/external volume, internal/external width, internal/external height, etc.). In such embodiments, first drive assembly 110 and second drive assembly 112 are housed within internal cavity defined by first housing 114 and second housing 116.

First drive assembly 110 may include a first motor 120 paired to a first transmission 122. First motor 120, which may be referred to as a first traction motor, may be any suitable rotary electric motor operable to provide sufficient forces and torque based on the application, such as to power one or more wheels of an electric vehicle (e.g., vehicle 101). Depending on the application, first motor 120 may convert direct current (DC) or alternating current (AC) electrical energy into mechanical energy. For example, first motor 120 may be driven by induced magnetic fields via DC or AC current. As shown, first motor 120 includes a first motor shaft 124 that is driven into rotation during operation. For example, first motor 120 may drive first motor shaft 124 to rotate about a first rotational axis (e.g., rotational axis A illustrated in FIG. 1B). First motor shaft 124 may be a hollow shaft, as illustrated, or may include other configurations.

First transmission 122, which may be referred to as a first gearbox, may include one or more gears, such as a first plurality of gears, to drive a first output shaft 126. For example, first transmission 122 may include a first gear 128, a second gear 130, a third gear 132, and a fourth gear 134, although other configurations are contemplated. In such examples, first motor 120 rotates first gear 128, such as via a first input shaft 138 rotatable about rotational axis A. First gear 128 then engages second gear 130 to rotate a first intermediate shaft 140 having third gear 132. As shown, first intermediate shaft 140 may be driven to rotate about a second rotational axis (e.g., rotational axis B illustrated in FIG. 1B). Third gear 132 then engages fourth gear 134 to rotate first output shaft 126 about a third rotational axis (e.g., rotational axis C illustrated in FIG. 1B). In embodiments, first output shaft 126 may be coupled to a wheel, such as first wheel 104A via first axle 106A. For example, first axle 106A may engage or be otherwise coupled to first output shaft 126 (e.g., via mechanical interference). Each of first input shaft 138, first intermediate shaft 140, and first output shaft 126 may be a hollow shaft, as illustrated, or include other configurations.

As shown, first motor shaft 124 may engage first input shaft 138, such as via mechanical interference or press fit, to rotate first input shaft 138 about rotational axis A. In embodiments, first gear 128 may be formed monolithically with first input shaft 138 or coupled thereto (e.g., via mechanical interference or press fit), such that rotation of first input shaft 138 rotates first gear 128 about rotational axis A. Second gear 130 and third gear 132 may be formed monolithically with first intermediate shaft 140 or coupled to first intermediate shaft 140 (e.g., via mechanical interference or press fit), such that rotation of first intermediate shaft 140 rotates second gear 130 and third gear 132 about rotational axis B. Similarly, fourth gear 134 may be formed monolithically with first output shaft 126 or coupled thereto (e.g., via mechanical interference or press fit), such that rotation of first output shaft 126 rotates fourth gear 134 about rotational axis C. Such embodiments are illustrative only, and first transmission 122 may include any number of gears, shafts, and rotational axes.

Second drive assembly 112 may include a second motor 144 paired to a second transmission 146. Second motor 144, which may be referred to as a second traction motor, may be any suitable rotary electric motor operable to provide sufficient forces and torque based on the application, such as to power one or more wheels of an electric vehicle (e.g., vehicle 101). Depending on the application, second motor 144 may convert direct current (DC) or alternating current (AC) electrical energy into mechanical energy. For example, second motor 144 may be driven by induced magnetic fields via DC or AC current. Depending on the application second motor 144 may be similar (e.g., identical) to first motor 120 or include a different configuration to satisfy power and/or torque requirements. As shown, second motor 144 includes a second motor shaft 148 that is driven into rotation during operation. For example, second motor 144 may drive second motor shaft 148 to rotate about rotational axis A or a different rotational axis. Second motor shaft 148 may be a hollow shaft, as illustrated, or may include other configurations.

Second transmission 146, which may be referred to as a second gearbox, may include one or more gears, such as a second plurality of gears, to drive a second output shaft 150. For example, second transmission 146 may include a first gear 152, a second gear 154, a third gear 156, and a fourth gear 158, although other configurations are contemplated. In such examples, second motor 144 rotates first gear 152, such as via a second input shaft 162 rotatable about rotational axis A. First gear 152 then engages second gear 154 to rotate a second intermediate shaft 164 having third gear 156. As shown, second intermediate shaft 164 may be driven to rotate about rotational axis B or a different rotational axis. Third gear 156 then engages fourth gear 158 to rotate second output shaft 150 about rotational axis C or a different rotational axis. In embodiments, second output shaft 150 may be coupled to a wheel, such as second wheel 104B via second axle 106B. For example, second axle 106B may engage or be otherwise coupled to second output shaft 150 (e.g., via mechanical interference). In this manner, each motor/transmission configuration may power independent wheels of vehicle 101, although other configurations are contemplated. Each of second input shaft 162, second intermediate shaft 164, and second output shaft 150 may be a hollow shaft, as illustrated, or include other configurations.

As shown, second motor shaft 148 may engage second input shaft 162, such as via mechanical interference or press fit, to rotate second input shaft 162 about rotational axis A. In embodiments, first gear 152 may be formed monolithically with second input shaft 162 or coupled thereto (e.g., via mechanical interference or press fit), such that rotation of second input shaft 162 rotates first gear 152 about rotational axis A. Second gear 154 and third gear 156 may be formed monolithically with second intermediate shaft 164 or coupled to second intermediate shaft 164 (e.g., via mechanical interference or press fit), such that rotation of second intermediate shaft 164 rotates second gear 154 and third gear 156 about rotational axis B. Similarly, fourth gear 158 may be formed monolithically with second output shaft 150 or coupled thereto (e.g., via mechanical interference or press fit), such that rotation of second output shaft 150 rotates fourth gear 134 about rotational axis C. Such embodiments are illustrative only, and second transmission 146 may include any number of gears, shafts, and rotational axes.

With continued reference to FIG. 1B, various elements or features may support first drive assembly 110 and second drive assembly 112, or at least portions thereof. For instance, drive system 100 may include a center support 168, a first motor support 170, and a second motor support 172 housed within two-piece casing 102. Center support 168 is arranged between first drive assembly 110 and second drive assembly 112 to support at least portions of first drive assembly 110 and second drive assembly 112 (e.g., first transmission 122 and second transmission 146). For example, center support 168 may include one or more bearing recesses 174 to support respective bearings 176 for first transmission 122 and/or second transmission 146. As one example, center support 168 includes a first bearing recess 174A to support one or more first bearings 176A for first input shaft 138 and/or second input shaft 162, a second bearing recess 174B to support one or more second bearings 176B for first intermediate shaft 140 and/or second intermediate shaft 164, and a third bearing recess 174C to support one or more third bearings 176C for first output shaft 126 and/or second output shaft 150. As shown, first bearing recess 174A, second bearing recess 174B, and third bearing recess 174C may be defined by through bores or cutouts. In such embodiments, cutouts may support a fluid flow across center support 168. Such examples are illustrative only, and center support 168 may include other configurations, including embodiments in which the bearing recesses are formed on opposite sides of a solid center support 168, whether centered or off-center from each other.

Figure 1C:
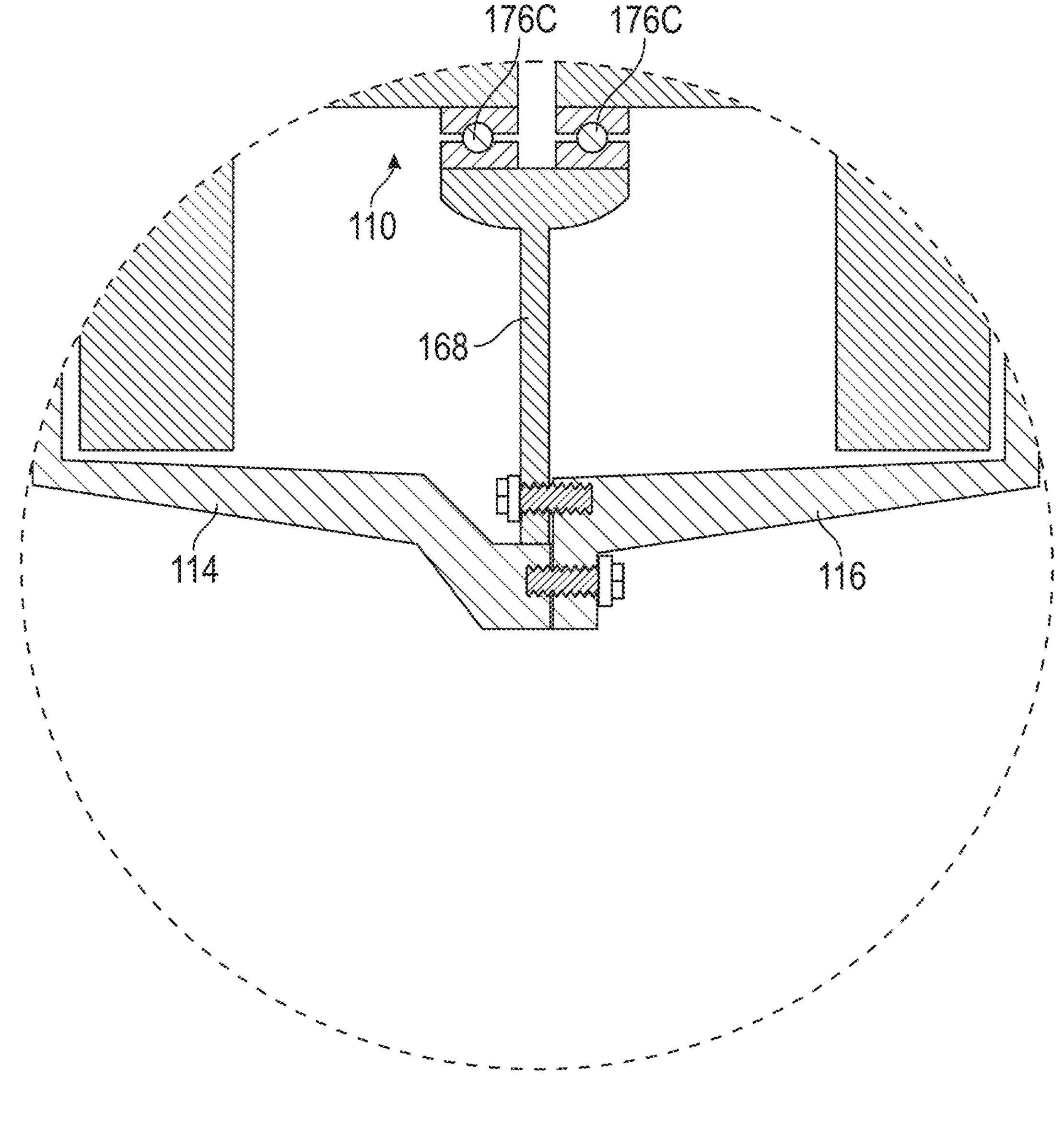
FIG. 1C is a diagram illustrating a cross-sectional view of the drive system showing center support 168 fastened to second housing 116, according to one or more embodiments of the disclosure.

As noted above, first drive assembly 110 is housed within first housing 114, and second drive assembly 112 is housed within second housing 116. For example, first motor 120 and first transmission 122 may be positioned within first housing 114, with first transmission 122 paired to first motor 120, such that first housing 114, first motor 120, and first transmission 122 is a first drive unit 178A. Similarly, second motor 144 and second transmission 146 may be positioned within second housing 116, with second transmission 146 paired to second motor 144, such that second housing 116, second motor 144, and second transmission 146 is a second drive unit 178B. In such embodiments, center support 168 may be arranged between first drive unit 178A and second drive unit 178B to support first transmission 122 and second transmission 146, with center support 168 secured internally to one of first housing 114 or second housing 116 (e.g., at seam 118 between first housing 114 and second housing 116). FIG. 1C shows center support 168 secured internally to second housing 116 in an alternate embodiment.

First motor support 170 may be internally secured within first housing 114 to support first motor 120. For example, first motor support 170 may be positioned between first motor 120 and first gear 128 of first transmission 122 to support both first motor shaft 124 and first input shaft 138. In such embodiments, first motor support 170 is configured to support a first motor bearing 180 for first motor shaft 124 of first motor 120, and a first shaft bearing 182 for first input shaft 138 of first transmission 122. In this manner, at least a portion of first transmission 122 may be supported by center support 168 and first motor support 170. In embodiments, first motor support 170 may seal first motor 120 from first transmission 122, such as to seal first motor 120 against transmission oil contained in the space dedicated for first transmission 122.

Second motor support 172 may be internally secured within second housing 116 to support second motor 144. For example, second motor support 172 may be positioned between second motor 144 and first gear 152 of second transmission 146 to support both second motor shaft 148 and second input shaft 162. In such embodiments, second motor support 172 is configured to support a second motor bearing 184 for second motor shaft 148 of second motor 144, and a second shaft bearing 186 for second input shaft 162 of second transmission 146. In this manner, at least a portion of second transmission 146 may be supported by center support 168 and second motor support 172. In embodiments, second motor support 172 may seal second motor 144 from second transmission 146, such as to seal second motor 144 against transmission oil contained in the space dedicated for second transmission 146.

With continued reference to FIG. 1B, two-piece casing 102 may support one or more bearings for first motor 120, second motor 144, first transmission 122, and/or second transmission 146. For example, first housing 114 may support a first bearing 188 for first motor shaft 124, a second bearing 190 for first intermediate shaft 140, and a third bearing 192 for first output shaft 126. In this manner, at least a portion of first transmission 122 may be supported by center support 168 and first housing 114.

In a similar manner, second housing 116 may support a fourth bearing 194 for second motor shaft 148, a fifth bearing 196 for second intermediate shaft 164, and a sixth bearing 198 for second output shaft 150. In this manner, first housing 114 may support first drive assembly 110, and second housing 116 may support second drive assembly 112. In this manner, at least a portion of second transmission 146 may be supported by center support 168 and second housing 116.

Figure 2:
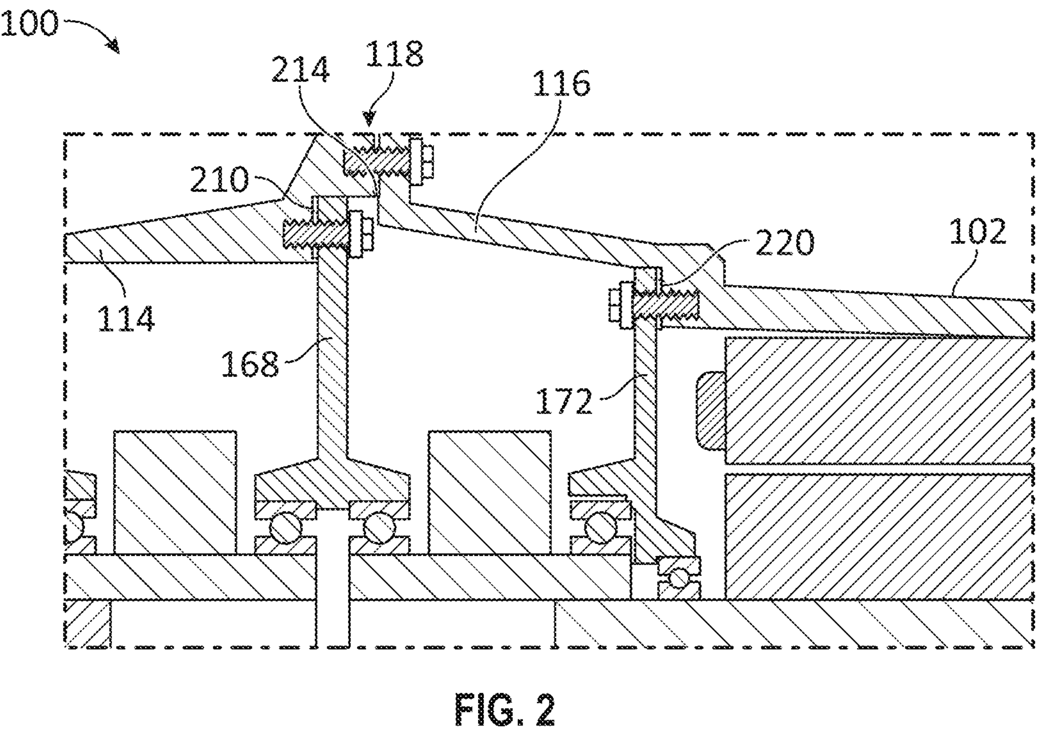
FIG. 2 is a diagram illustrating a fragmentary cross-sectional view of the drive system of FIG. 1A, according to one or more embodiments of the disclosure.

FIG. 2 is a diagram illustrating a fragmentary cross-sectional view of drive system 100, according to one or more embodiments of the disclosure. Referring to FIG. 2, center support 168 may be secured to an internal mating surface 210 of first housing 114, such that center support 168 is contained or housed entirely within two-piece casing 102 when sealed. Internal mating surface 210 may be near seam 118, although other configurations are contemplated. In such embodiments, first housing 114 may include a stepped lip or edge 214 to receive both center support 168 and second housing 116. As shown, center support 168 may be fastened to internal mating surface 210 by mechanical fasteners, but may be attached by other methods, such as snap rings, pins, friction/press-fit, etc.

As shown, second motor support 172 may be secured to an internal surface 220 of second housing 116, such that second motor support 172 is contained or housed entirely within two-piece casing 102 when sealed. As shown, second motor support 172 may be fastened to internal surface 220 by mechanical fasteners, but may be attached by other methods, such as snap rings, pins, friction/press-fit, etc. Referring to FIG. 1B, first motor support 170 may be secured to an internal surface of first housing 114 in a similar manner.

Figure 3A:
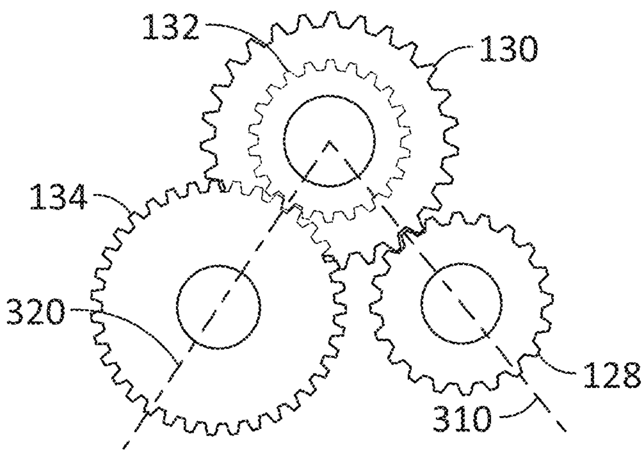
FIG. 3A is a diagram illustrating a folded gear orientation, according to one or more embodiments of the disclosure.
Figure 3B:
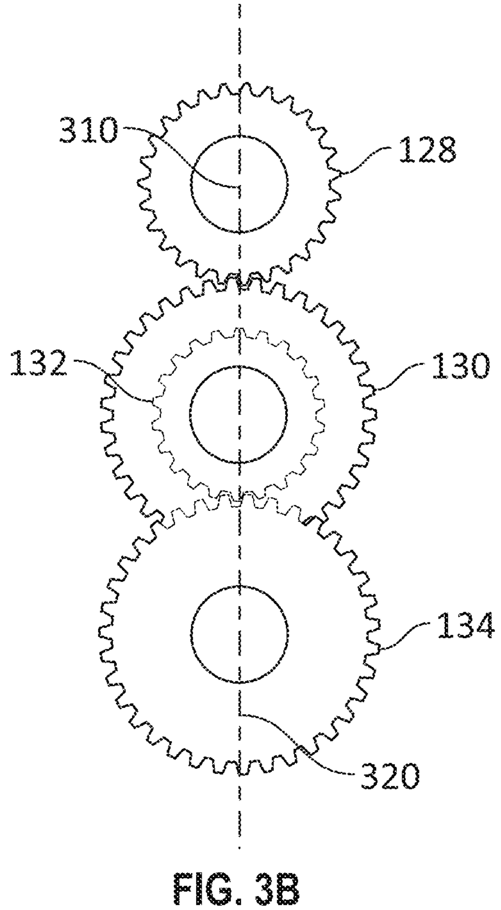
FIG. 3B is a diagram illustrating an in-plane gear orientation, according to one or more embodiments of the disclosure.

FIG. 3A is a diagram illustrating a folded gear orientation, according to one or more embodiments of the disclosure. FIG. 3B is a diagram illustrating an in-plane gear orientation, according to one or more embodiments of the disclosure. First transmission 122 and second transmission 146 may be arranged in many configurations or orientations to meet dimension constraints. For example, referring to FIG. 3A, first transmission 122 may include a folded gear orientation in which a first plane 310 defined by the centerlines of first gear 128 and second gear 130/third gear 132 extends at an angle to a second plane 320 defined by the centerlines of second gear 130/third gear 132 and fourth gear 134. Depending on the application, first plane 310 and second plane 320 may define an acute angle, an obtuse angle, or a right angle therebetween. Referring to FIG. 3B, first transmission 122 may include an in-plane orientation in which first plane 310 and second plane 320 are aligned (e.g., inline or in the same plane). Second transmission 146 may include a similar or different configuration shown in FIG. 3A or FIG. 3B.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A drive system comprising:

a two-piece casing having a first housing secured to a second housing along a single seam therebetween;

a first drive assembly housed within the two-piece casing, the first drive assembly comprising a first motor paired to a first transmission;

a second drive assembly housed within the two-piece casing, the second drive assembly comprising a second motor paired to a second transmission; and a center support housed within the two-piece casing and arranged between the first drive assembly and the second drive assembly to support the first transmission and the second transmission.

2. The drive system of claim 1, wherein the first housing supports the first drive assembly, and the second housing supports the second drive assembly.

3. The drive system of claim 2, wherein the center support is fastened to an internal mating surface of the first housing, the internal mating surface near the single seam.

4. The drive system of claim 2, further comprising:

a first motor support internally fastened within the first housing to support the first motor; and a second motor support internally fastened within the second housing to support the second motor.

5. The drive system of claim 1, wherein:

the first transmission comprises a first plurality of gears to drive a first output shaft; and the second transmission comprises a second plurality of gears to drive a second output shaft.

6. The drive system of claim 5, wherein each of the first plurality of gears and the second plurality of gears comprises:

a first gear driven by the first motor or the second motor;

a second gear driven by the first gear to rotate an intermediate shaft having a third gear;

a fourth gear driven by the third gear to drive the first output shaft or the second output shaft.

7. The drive system of claim 1, wherein the center support comprises one or more bearing recesses to support respective bearings for the first transmission and the second transmission.

8. A drive system comprising:

a two-piece casing comprising a first housing secured to a second housing along a single seam therebetween;

a first drive assembly positioned within the two-piece casing;

a second drive assembly positioned within the two-piece casing; and a center support internally fastened within the two-piece casing to the first housing or the second housing, the center support positioned to support at least portions of the first drive assembly and the second drive assembly.

9. The drive system of claim 8, wherein the center support is secured to the first housing or the second housing at the single seam.

10. The drive system of claim 8, wherein the center support is fastened to a mating surface of the first housing internal to the two-piece casing.

11. The drive system of claim 8, wherein:

the first drive assembly comprises a first motor paired to a first transmission; and at least a portion of the first transmission is supported by the first housing and the center support.

12. The drive system of claim 11, further comprising a first motor support secured within the first housing to support the first motor, wherein at least a portion of the first transmission is supported by the center support and the first motor support.

13. The drive system of claim 11, wherein:

the second drive assembly comprises a second motor paired to a second transmission; and at least a portion of the second transmission is supported by the second housing and the center support.

14. The drive system of claim 13, further comprising a second motor support secured within the second housing to support the second motor, wherein at least a portion of the second transmission is supported by the center support and the second motor support.

15. A drive system comprising:

a first drive unit comprising:

a first housing, a first motor positioned within the first housing, and a first transmission paired to the first motor and positioned within the first housing;

a second drive unit secured to the first drive unit, the second drive unit comprising:

a second housing, a second motor positioned within the second housing, and a second transmission paired to the second motor and positioned within the second housing, wherein the first and second housings form a two-piece casing of the drive system having a single seam therebetween; and a center support arranged between the first drive unit and the second drive unit and configured to support the first transmission and the second transmission, wherein the center support is secured internally to the first housing or the second housing.

16. The drive system of claim 15, wherein the center support is fastened to an internal mating surface of the first housing.

17. The drive system of claim 16, wherein the center support is secured to the first housing at the single seam between the first housing and the second housing.

18. The drive system of claim 16, further comprising:

a first motor support internally fastened within the first housing to support the first motor; and a second motor support internally fastened within the second housing to support the second motor.

19. The drive system of claim 15, wherein the center support comprises at least one of:

one or more bearing recesses to support each of the first transmission and the second transmission; or one or more cutouts to support a fluid flow across the center support.

20. The drive system of claim 15, wherein:

the first transmission comprises a first plurality of gears to drive a first output shaft;

the second transmission comprises a second plurality of gears to drive a second output shaft; and the first plurality of gears, the second plurality of gears, the first output shaft, and the second output shaft are rotatably supported by the center support.

* * * * *